Patented Nov. 26, 1940

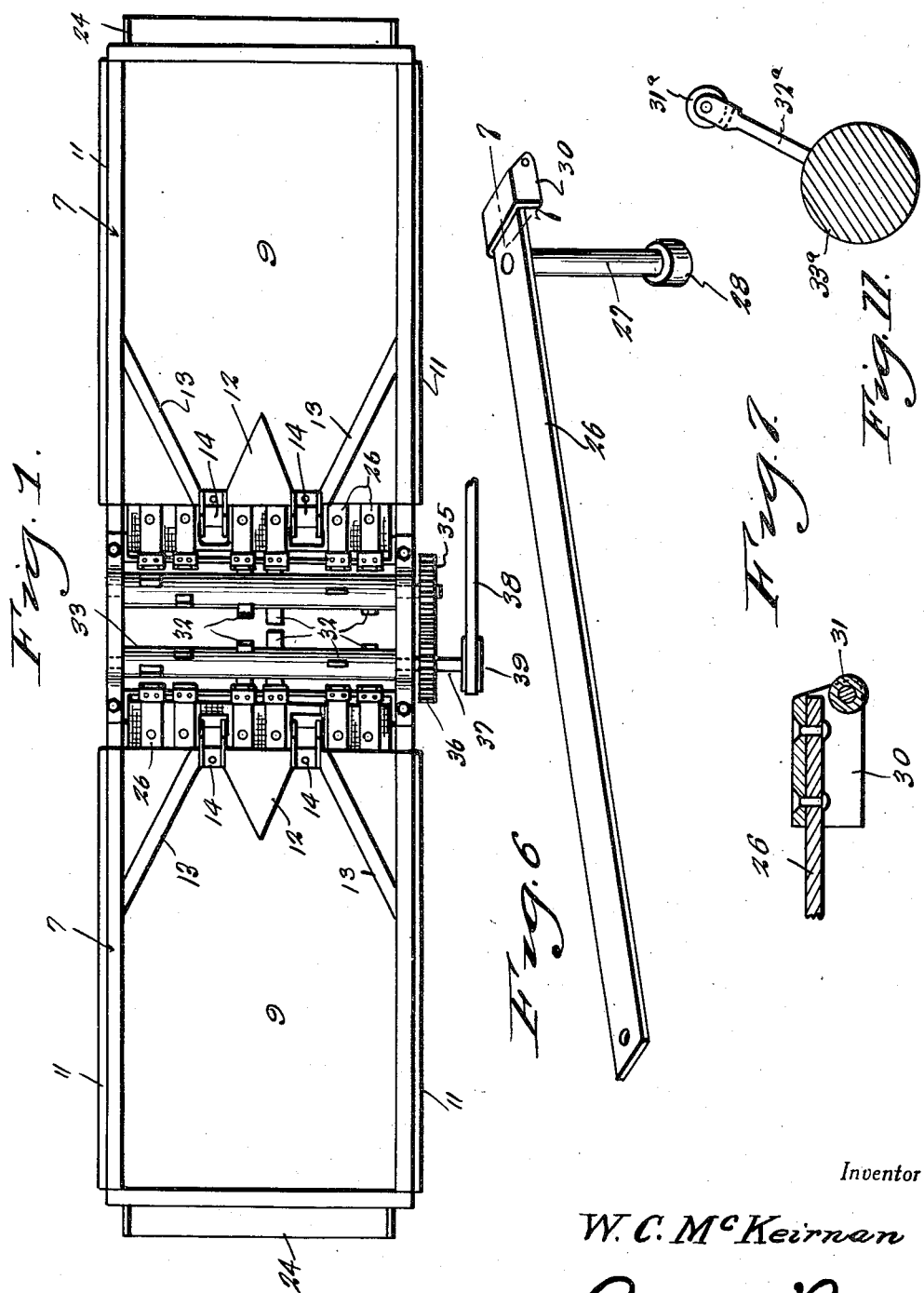

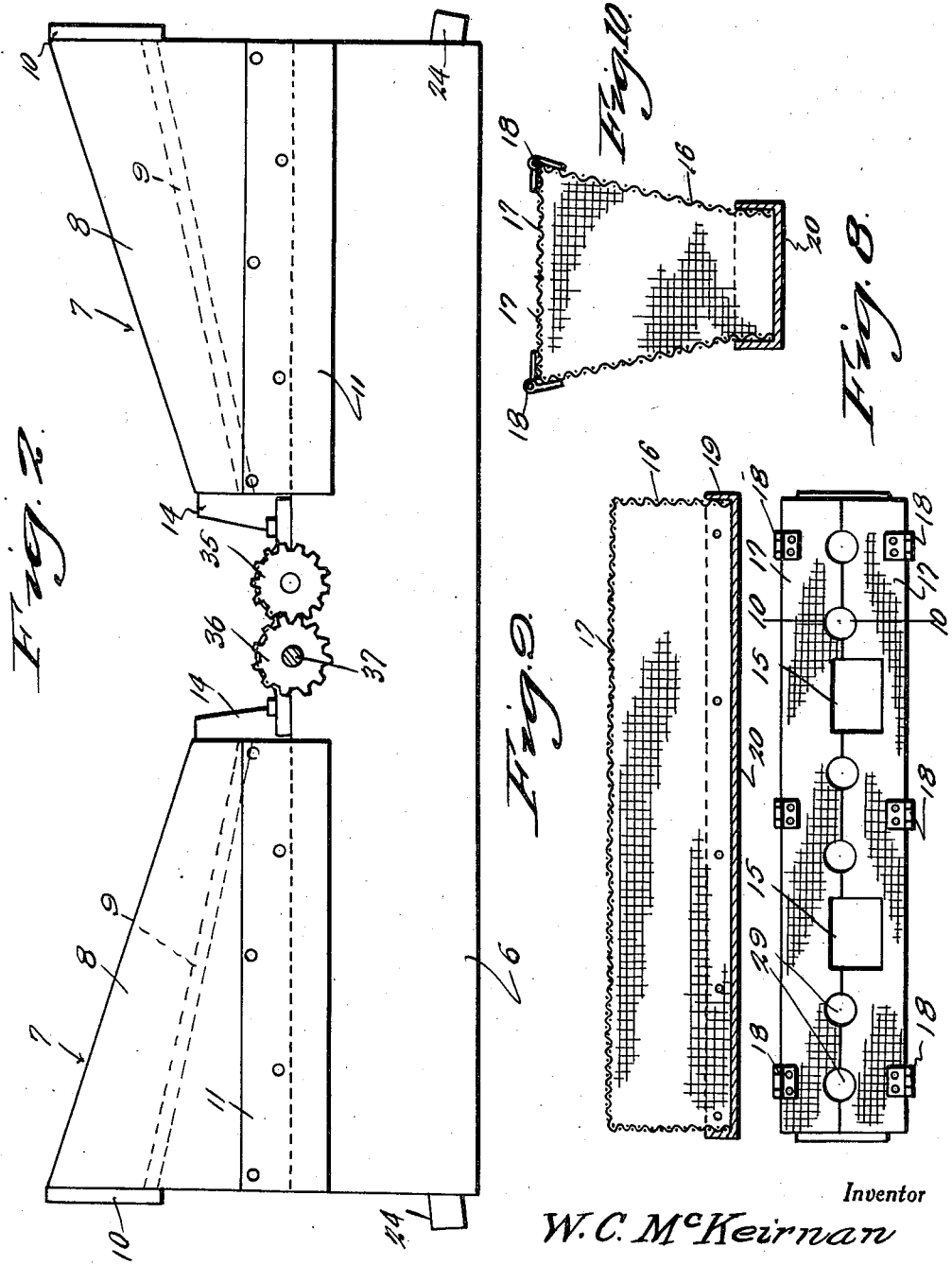

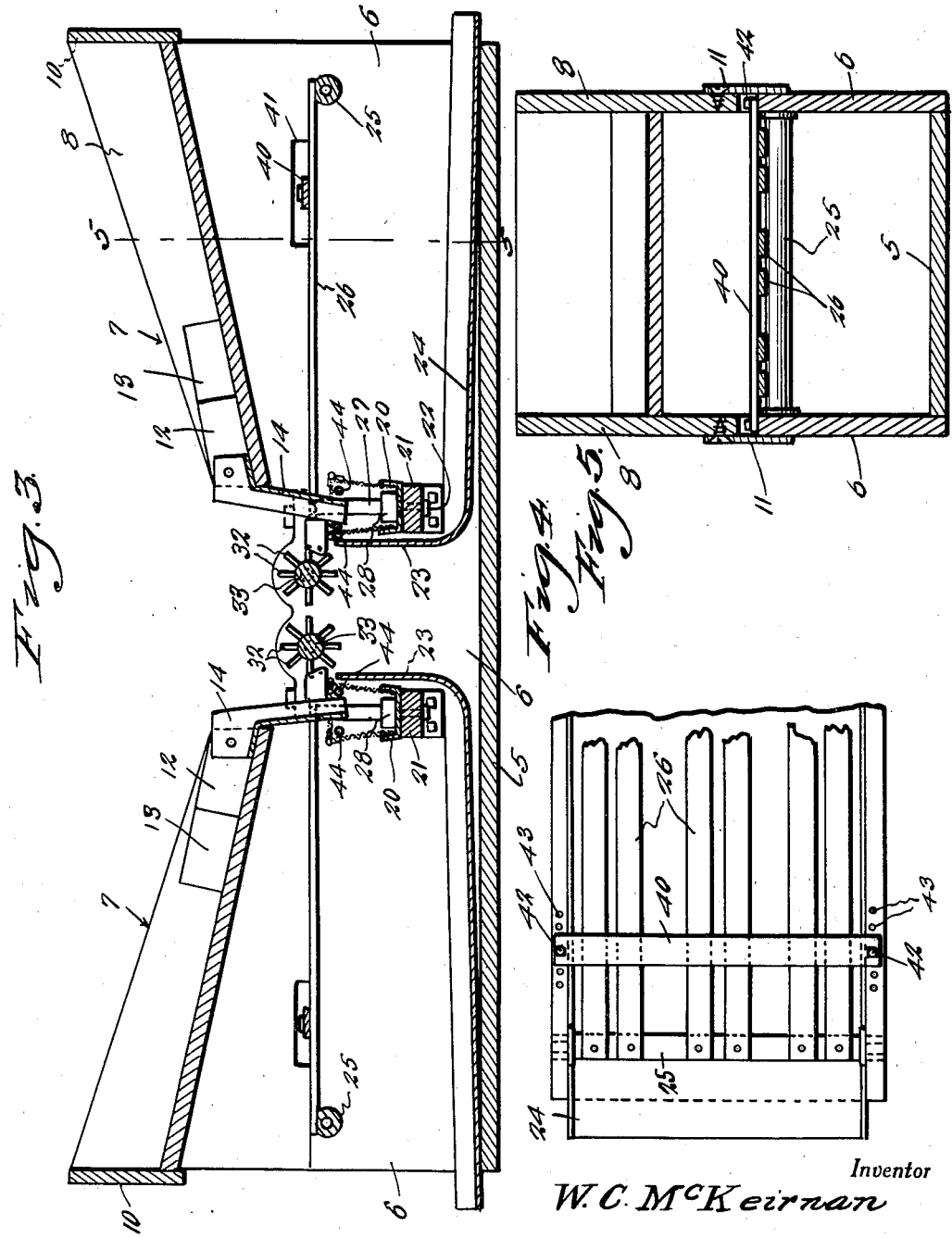

2,222,821

UNITED STATES PATENT OFFICE 2,222,821

ORE MILL

William C. McKeirnan, Gazelle, Calif., assignor of one-half to Charles S. Davidson, Weed, Calif.

Application February 9, 1939, Serial No. 255,500

1 Claim. (Cl. 83—57)

This invention appertains to new and useful improvements in ore mills in which ore can be crushed in an efficient and expeditious manner.

The principal object of the present invention is to provide an ore mill whereby ore can be crushed quickly and without any danger whatsoever to the workmen.

Other objects and advantages of the invention will become apparent to the reader of the following specification.

In the drawings:

Figure 1 represents a top plan view.

Figure 2 is a side elevational view.

Figure 3 is a longitudinal sectional view.

Figure 4 is a top plan view with the chute removed at one side of the machine.

Figure 5 is a section on the line 5—5 of Figure 3.

Figure 6 is a perspective view of one of the spring units.

Figure 7 is a sectional view taken substantially on the line 7—7 of Figure 6.

Figure 8 is a top plan view of one of the baskets.

Figure 9 is a longitudinal sectional view through one of the baskets.

Figure 10 is a section on the line 10—10 of Figure 8.

Figure 11 is a sectional view through one of the rolls showing one of the spring operating arms modified.

Referring to the drawings wherein like numerals designate like parts, it can be seen that the apparatus includes the base 5 having the side walls 6. At each end of this structure is a chute generally referred to by numeral 7 and this chute consists of the tapered side walls 8 between which is mounted the inclined bottom 9. The side walls 8 are bridged at their upper portion by the back wall 10. Aprons 11 are secured to the side walls 8 and these interlap the side walls 6 of the machine to prevent displacement of the chutes from the machine.

As there are two of these chutes and corresponding mechanism for each, a description of one will suffice for both.

The chute is provided at its lower portion with a spreader 12 and outwardly of these spreaders are the guide cleats 13. This spreader and guide cleats serve to guide the material downwardly to the spouts 14—14 which are of channeled construction and depend through the openings 15 in the corresponding mortar box 16. These openings 15—15 are in the top of the box, the top being divided to provide the doors 17—17 which are hingedly connected as at 18 to the side walls of the box 16. The box 16 is secured to the upstanding flanges 19 of the anvil plate 20 which is removably mounted on the main anvil block 21 and is suitably secured thereto by bolts 22.

The anvil block 21 is secured in place between the side walls 6 and is located adjacent the inner upstanding wall 23 of the tray 24.

A cross member 25 is provided between the side walls 6 and from these extend a plurality of spring arms 26 shown in Figure 4. These spring arms each has a depending stem 27 at its free end terminating in a stamp 28 operating in the box 16. The stems 27 operate through openings 29 in the top of the box and of course the stamps 28 operate against the rock in the box.

A flanged structure 30 is secured to the free end of each spring member 26 and between the flanges of this member 30 is mounted a roller 31 against which cams 32 on the corresponding rolls 33 ride. The cam shafts 33 have gears 35 and 36 which mesh and one has a shaft extension 37 and a belt and pulley 38—39 serves to drive the shafts 33.

A cross bar 40 disposed through the slot 41 in the side walls 6 has its ends apertured to receive the bolt 42 which can be disposed through any set of the openings 43 to regulate the tension of the spring arms 26.

It can be seen that when the shafts 33 are operated, the cams 32 ride against the corresponding ends of the spring arms 26. The cams lift the arms 26 until the arms slip off the tips of the cams, whereupon the arms spring downward with great force, with the result that the stamps crush the ore. The ore thus crushed screens through the sides of the mortar box as water plays in the same, and passes onto the amalgamated plates 24. Water pipes perforated to permit a discharge of water on the contents of the boxes 16 are provided and these are denoted by numeral 44.

As can be seen in Figure 11, the arms 32a projecting from the shafts 33 can be provided with rollers 31a at their outer ends instead of having rollers 31 on the spring arms 26.

While the foregoing specification sets forth the invention in specific terms, it is to be understood that numerous changes in shape, size and materials may be resorted to without departing from the spirit and scope of the invention as claimed hereinafter.

Having described the invention, what is claimed as new is:

An ore stamp mill comprising an anvil, a perforate basket disposed on the anvil, a plurality of stamps operative in the basket and cooperative with the anvil, said basket being provided with a movable top, each of the stamps having an upwardly disposed shank, a plurality of leaf springs each having its free end portion connected to a corresponding shank and its opposite end portion stationarily anchored, trip means for lifting and releasing the leaf springs at the shank ends thereof, said basket top having an opening therein and an ore chute extending downwardly into the basket through the opening in the top thereof.

WILLIAM C. McKEIRNAN.